(12) United States Patent
Li

(10) Patent No.: US 12,069,376 B2
(45) Date of Patent: Aug. 20, 2024

(54) IMAGE EXPOSURE METHOD AND DEVICE, UNMANNED AERIAL VEHICLE

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 112 days.

(21) Appl. No.: 17/855,049

(22) Filed: Jun. 30, 2022

(65) Prior Publication Data

US 2022/0345607 A1 Oct. 27, 2022

Related U.S. Application Data

(63) Continuation of application No. PCT/CN2020/133967, filed on Dec. 4, 2020.

(30) Foreign Application Priority Data

Dec. 30, 2019 (CN) .......................... 201911395164.8

(51) Int. Cl.
*H04N 23/72* (2023.01)
*B64C 19/00* (2006.01)
(Continued)

(52) U.S. Cl.
CPC .............. *H04N 23/72* (2023.01); *B64C 19/00* (2013.01); *B64C 39/024* (2013.01); *G06T 7/70* (2017.01);
(Continued)

(58) Field of Classification Search
CPC ........ H04N 23/72; H04N 23/71; H04N 23/73; B64C 19/00; B64C 39/024; G06T 7/70;
(Continued)

(56) References Cited

U.S. PATENT DOCUMENTS 7,415,203 B2 8/2008 Lee
2005/0271379 A1* 12/2005 Lee ........................ H04N 23/71
396/234

(Continued)

FOREIGN PATENT DOCUMENTS

CN 1512256 A 7/2004
CN 101064783 A 10/2007
(Continued)

OTHER PUBLICATIONS

International Search Report mailed Mar. 8, 2021; PCT/CN2020/133967.

*Primary Examiner* — Michael Lee
(74) *Attorney, Agent, or Firm* — Frank Gao, Esq.

(57) ABSTRACT

Embodiments of the present invention are an image exposure method and device for an unmanned aerial vehicle, and an unmanned aerial vehicle. The method comprises: firstly, acquiring the original image information about a target object, then obtaining the weighted image information according to the original image information, further obtaining the compensation amount of an automatic exposure according to the weighted image information, and finally adjusting an automatic exposure strategy according to the compensation amount of the automatic exposure. The method prevents an unmanned aerial vehicle from easily losing a target during the process of the unmanned aerial vehicle automatically following a moving object, even when encountering a change in light and shadow.

12 Claims, 4 Drawing Sheets

(51) Int. Cl.
 *B64C 39/02* (2023.01)
 *B64U 50/19* (2023.01)
 *B64U 101/30* (2023.01)
 *G06T 7/70* (2017.01)
 *H04N 23/71* (2023.01)

(52) U.S. Cl.
 CPC ............ *H04N 23/71* (2023.01); *B64U 50/19* (2023.01); *B64U 2101/30* (2023.01); *G06T 2207/10032* (2013.01); *G06T 2207/10144* (2013.01)

(58) Field of Classification Search
 CPC ......... G06T 2207/10032; G06T 2207/10144; B64U 50/19; B64U 2101/30
 See application file for complete search history.

(56) References Cited

U.S. PATENT DOCUMENTS

| | | | |
|---|---|---|---|
| 2006/0198627 A1* | 9/2006 | So ..................... | H04N 23/73 348/E5.037 |
| 2007/0115372 A1* | 5/2007 | Wu ..................... | H04N 23/71 348/230.1 |
| 2007/0253693 A1* | 11/2007 | Hsu .................... | G03B 7/00 396/213 |
| 2011/0293259 A1* | 12/2011 | Doepke ............... | H04N 23/62 348/E5.034 |
| 2014/0232895 A1* | 8/2014 | Schieltz .............. | H04N 23/661 348/222.1 |
| 2017/0192430 A1* | 7/2017 | Yang .................. | H04N 23/6815 |
| 2019/0228505 A1* | 7/2019 | Douady-Pleven ... | H04N 23/685 |
| 2020/0410219 A1* | 12/2020 | Aramaki ............. | G06V 20/17 |

FOREIGN PATENT DOCUMENTS

| | | | | |
|---|---|---|---|---|
| CN | 102169276 A | | 8/2011 | |
| CN | 103391404 A | | 11/2013 | |
| CN | 106534627 A | * | 3/2017 | ........... B64C 39/024 |
| CN | 107105172 A | | 8/2017 | |
| CN | 107241558 A | | 10/2017 | |
| CN | 110166706 A | | 8/2019 | |
| CN | 111131721 A | | 5/2020 | |
| TW | 201918996 A | | 5/2019 | |

\* cited by examiner

IMAGE EXPOSURE METHOD AND DEVICE, UNMANNED AERIAL VEHICLE

CROSS REFERENCE

The present application is a continuation of International Application No. PCT/CN2020/133967, filed on Dec. 4, 2020, which claims priority to Chinese Patent Application No. 201911395164.8, filed on Dec. 30, 2019, which is incorporated herein by reference in its entirety.

BACKGROUND

Technical Field

The present invention relates to the technical field of unmanned aerial vehicles, and more particularly, to an image exposure method and device, and an unmanned aerial vehicle.

Related Art

Currently, aircraft, such as unmanned aerial vehicles (UAVs), also known as an unmanned aerial vehicle, are now being used more and more widely. Unmanned aerial vehicles have the advantages of small size, light weight, flexible mobility, fast response, unmanned driving, and low operating requirements. Unmanned aerial vehicles can carry an aerial camera through a pan-tilt, and can also achieve real-time image transmission and high-risk region detection, which is a powerful supplement to satellite remote sensing and traditional aerial remote sensing. In recent years, the unmanned aerial vehicle has wide application prospects in disaster investigation and rescue, aerial monitoring, electric transmission line inspection, aerial photography, aerial surveying, and military fields.

In the process of aerial photography, an aerial camera is used to acquire high dynamic range images (HDR). But when the unmanned aerial vehicle automatically follows a moving object, it often encounters the change of light and shadow, and sometimes the object it follows even enters a shaded place. As the object it follows has low illuminance, and the background illuminance is high, when the unmanned aerial vehicle follows the object, it is very easy to lose the target.

SUMMARY

In order to solve the above-mentioned technical problem, embodiments of the present invention provide an image exposure method and device, and an unmanned aerial vehicle to prevent an unmanned aerial vehicle from easily losing a target during the process of the unmanned aerial vehicle automatically following a moving object, even when encountering a change in light and shadow.

In order to solve the above technical problem, embodiments of the present invention provide the following technical solutions: an image exposure method applied to an unmanned aerial vehicle, the image exposure method comprising: acquiring the original image information about a target object;

obtaining weighted image information according to the original image information;

obtaining compensation amount of automatic exposure according to the weighted image information;

and adjusting an automatic exposure strategy according to the compensation amount of the automatic exposure.

Optionally, the obtaining weighted image information according to the original image information comprises:

according to the original image information, obtaining target position information of the target object;

and performing high-weight exposure on a target area corresponding to the target position information to obtain the weighted image information.

Optionally, obtaining compensation amount of automatic exposure according to the weighted image information comprises:

according to the weighted image information, obtaining a total image brightness and a total image weight corresponding to the weighted image information;

obtaining an evaluation value of the automatic exposure according to the total image weight and the total image brightness;

and obtaining the compensation amount of the automatic exposure according to the acquired target value of the automatic exposure and the evaluation value of the automatic exposure.

Optionally, adjusting an automatic exposure strategy according to the compensation amount of the automatic exposure comprises:

acquiring a brightness specific gravity corresponding to the target area;

and when the compensation amount of the automatic exposure is greater than a preset exposure threshold value and when the brightness specific gravity is greater than a preset brightness threshold value, increasing corresponding exposure time, analog gain, and digital gain.

Optionally, adjusting an automatic exposure strategy according to the compensation amount of the automatic exposure comprises:

acquiring a brightness specific gravity corresponding to the target area;

and when the compensation amount of the automatic exposure is smaller than a preset exposure threshold value and when the brightness specific gravity is greater than a preset brightness threshold value, reducing corresponding exposure time, analog gain, and digital gain.

Optionally, acquiring a brightness specific gravity corresponding to the target area comprises:

acquiring a target area weighted brightness corresponding to the target area;

and obtaining a brightness specific gravity according to the total image brightness and the target area weighted brightness.

In order to solve the above technical problem, the embodiments of the present invention also provide the following technical solutions: an image exposure device applied to an unmanned aerial vehicle. The image exposure device comprises: an original image information acquisition module used for acquiring original image information about a target object;

a weighted image information acquisition module used for obtaining weighted image information according to the original image information;

an automatic exposure compensation amount calculation module used for obtaining the compensation amount of an automatic exposure according to the weighted image information;

and an automatic exposure strategy adjustment module used for adjusting an automatic exposure strategy according to the compensation amount of the automatic exposure.

Optionally, the weighted image information acquisition module comprises a target position information acquisition unit and a high-weight exposure unit;

the target position information acquisition unit is used for obtaining target position information about the target object according to the original image information;

and the high-weight exposure unit is used for performing high-weight exposure on a target area corresponding to the target position information to obtain weighted image information.

Optionally, the automatic exposure compensation amount calculation module comprises an image information acquisition unit, an automatic exposure evaluation value acquisition unit, and an automatic exposure compensation amount calculation unit;

the graphic information acquisition unit is used for obtaining a total image brightness and a total image weight corresponding to the weighted image information according to the weighted image information;

the automatic exposure evaluation value acquisition unit is used for obtaining an evaluation value of automatic exposure according to the total image weight and the total image brightness;

and the automatic exposure compensation amount calculation unit is used for obtaining the compensation amount of automatic exposure according to the acquired target value of the automatic exposure and the evaluation value of the automatic exposure.

In order to solve the above technical problem, an embodiment of the present invention also provides the following technical solutions: an unmanned aerial vehicle. The unmanned aerial vehicle comprises: a fuselage;

a horn connected to the fuselage;

a power device provided on the horn for providing flying power to the unmanned aerial vehicle;

a flight control module; and a memory communicatively connected to the flight control module; wherein the memory stores instructions executable by the flight control module, the instructions being executed by the flight control module to enable the flight control module to be used for executing the image exposure method.

Compared with the prior art, an image exposure method for an unmanned aerial vehicle provided by an embodiment of the present invention includes: firstly, acquiring the original image information about a target object, then obtaining the weighted image information according to the original image information, further obtaining the compensation amount of an automatic exposure according to the weighted image information, and finally adjusting an automatic exposure strategy according to the compensation amount of the automatic exposure. The method prevents an unmanned aerial vehicle from easily losing a target during the process of the unmanned aerial vehicle automatically following a moving object, even when encountering a change in light and shadow.

BRIEF DESCRIPTION OF THE DRAWINGS

One or more embodiments are exemplified by the pictures in the corresponding drawings, and these exemplifications do not constitute limitations of the embodiments, and elements with the same reference numerals in the drawings are denoted as similar elements. Unless otherwise stated, the figures in the accompanying drawings do not constitute a scale limitation.

DETAILED DESCRIPTION

In order to facilitate the understanding of the present invention, the present invention will be described in more detail below with reference to the accompanying drawings and specific embodiments. It should be noted that when an element is referred to as being "fixed to" another element, it can be directly on the other element, or one or more intervening elements may be present therebetween. When an element is referred to as being "connected" to another element, it can be directly connected to the other element or one or more intervening elements may be present therebetween. As used in this specification, orientations or positional relationships indicated by the terms "upper", "lower", "inner", "outer", "bottom", and the like are based on the orientation or positional relationships shown in the figures, and are merely for the convenience in describing the invention and to simplify the description, and do not indicate or imply that the device or element being referred to must have a particular orientation or be constructed and operated in a particular orientation, and are thus not to be construed as limiting the invention. Furthermore, the terms "first", "second", "third", and the like are used for descriptive purposes only and are not to be construed as indicating or implying relative importance.

Unless defined otherwise, all technical and scientific terms used in the specification have the same meaning as commonly understood by one of ordinary skills in the art to which this invention belongs. The terms used in the description of the present invention in this specification are only for the purpose of describing specific embodiments, and are not used to limit the present invention. As used herein, the term "and/or" includes any and all combinations of one or more of the associated listed items.

Furthermore, the technical features of the various embodiments of the present invention described below can be combined as long as they do not conflict with each other.

An embodiment of the present invention provides an image exposure method and an unmanned aerial vehicle. The image exposure method applied to the unmanned aerial vehicle firstly acquires the original image information about a target object, then obtains the weighted image information according to the original image information, further obtains the compensation amount of an automatic exposure according to the weighted image information, and finally adjusts the automatic exposure strategy according to the compensation amount of the automatic exposure. The above-mentioned method prevents an unmanned aerial vehicle from easily losing a target during the process of the unmanned aerial vehicle automatically following a moving object, even when encountering a change in light and shadow.

An application environment of the image exposure method is exemplified below.

Figure 1:
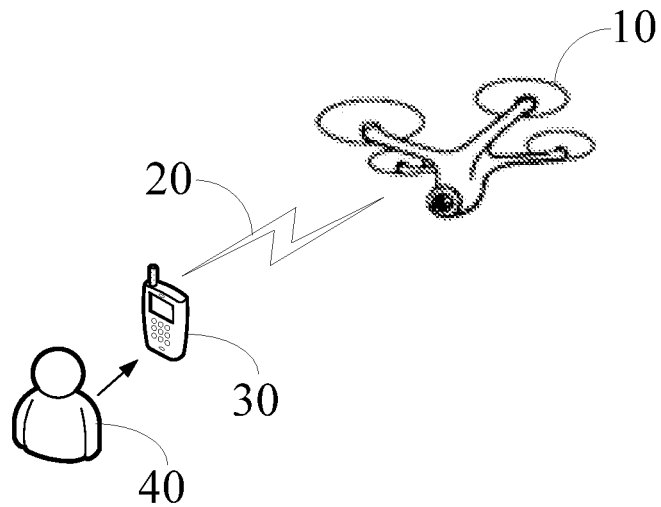
FIG. 1 is a schematic view of an application environment of an embodiment of the present invention.

FIG. 1 is a schematic view of an application environment of a non-aircraft control method provided by an embodiment of the present invention. As shown in FIG. 1, the application scenario includes an unmanned aerial vehicle 10, an infrared wireless network 20, a remote control device 30, and a user 40. The user 40 can control the unmanned aerial vehicle 10 via the infrared wireless network by using the remote control device 30.

The unmanned aerial vehicle 10 may be any type of a powered unmanned flight carrier, including, but not limited to, a rotor-wing unmanned aerial vehicle, a fixed-wing unmanned aerial vehicle, a para-wing unmanned aerial vehicle, a flapping-wing unmanned aerial vehicle, a helicopter model, and the like.

The unmanned aerial vehicle 10 can have a corresponding volume or power according to the requirements of actual situations, so as to provide a load capacity, a flight speed, a flight endurance mileage, and the like which can meet the use requirements. One or more functional modules may also be added to the unmanned aerial vehicle 10 to enable the unmanned aerial vehicle 10 to realize the corresponding functions.

For example, in the present embodiment, the unmanned aerial vehicle 10 is provided with a battery module, a positioning device, and an infrared emission device, and a pan-tilt and an aerial camera. The aerial camera is mounted on the unmanned aerial vehicle 10 via the pan-tilt for photographing, video recording, and the like.

The pan-tilt is used for fixing the aerial camera, or for adjusting the attitude of the aerial camera at will (for example, changing the shooting direction of the aerial camera) and keeping the aerial camera stably at a set attitude. The pan-tilt 20 comprises a base, a motor, and a motor controller. The base is fixedly connected or detachably connected to the unmanned aerial vehicle for mounting the aerial camera on the unmanned aerial vehicle; the motor is mounted on the base and connected to the aerial camera, and the motor controller is electrically connected to the motor for controlling the motor. The pan-tilt may be a multi-shaft pan-tilt, and the number of motors is adapted thereto, namely, one motor is provided for each shaft.

On the one hand, multiple motors can drive the rotation of the aerial camera so as to satisfy the adjustment of different shooting directions of the aerial camera, and the rotation of the motor is controlled manually and remotely or the motor is rotated automatically by using a program so as to achieve the function of omnibearing scanning and monitoring; on the other hand, in the process of the aerial photography of the unmanned aerial vehicle, through the rotation of the motor, the disturbance applied to the aerial camera is counteracted in real time, so as to prevent the aerial camera from shaking and ensure the stability of the shooting picture.

The aerial camera comprises a camera housing and a camera connected to the camera housing. A pan-tilt connecting member is provided on the camera housing for connecting to the pan-tilt. A depth camera is also mounted on the camera housing, and the depth camera and the main camera are mounted on the same surface of the camera housing. The depth camera can be mounted on its mounting surface in a horizontal, longitudinal, or oblique direction. When the pan-tilt motor rotates, the depth camera moves synchronously with the camera, always facing in the same direction.

When the battery module is connected to the unmanned aerial vehicle 10, the battery module can provide a power supply for the unmanned aerial vehicle 10.

The positioning device may be a GPS positioning system, and the GPS positioning system is used for acquiring real-time geographical position information about an unmanned aerial vehicle.

The infrared emission device is used for sending infrared access information and receiving an infrared control instruction sent by a remote control device. For example, when the remote control device sends out an infrared control instruction, the infrared emission device receives the infrared control instruction, thereby enabling the unmanned aerial vehicle 10 to control the starting state of the unmanned aerial vehicle 10 according to the infrared control instruction. After the battery module is connected to the unmanned aerial vehicle 10, the infrared emission device can send infrared access information obtained according to the access information of the battery module to the remote control device 30.

The unmanned aerial vehicle 10 comprises at least one flight control module as a control core of the flight, data transmission, etc. of the unmanned aerial vehicle 10, and has the capability of monitoring, calculating, and manipulating the flight and mission of the unmanned aerial vehicle. In the present embodiment, the flight control module can also modulate a binary digital signal into an infrared signal in the form of a corresponding optical pulse or demodulate an infrared signal in the form of an optical pulse into a binary digital signal. The remote control device 30 may be any type of intelligent device for establishing a communication connection with the unmanned aerial vehicle 10, such as a cell phone, tablet computer, notebook computer, or other mobile manipulation terminals.

The remote control device 30 is equipped with an infrared receiving device for receiving infrared access information and sending an infrared control instruction for controlling the unmanned aerial vehicle. For example, the remote control device 30 may be used to receive infrared access information generated by the unmanned aerial vehicle 10 when the battery module is normally connected to the unmanned aerial vehicle. At the same time, the remote control device 30 can send an infrared control instruction generated according to the control instruction of the user 40 to the unmanned aerial vehicle 10 so as to control the starting state of the unmanned aerial vehicle 10. The remote control device 30 may also be equipped with an image transmission module for controlling the back transmission of a positioning picture, a pan-tilt photographed picture, and an aiming picture. In this embodiment, the image transmission module may also modulate a binary digital signal into an infrared signal in the form of a corresponding optical pulse or demodulate an infrared signal in the form of an optical pulse into a binary digital signal.

The remote control device 30 may also be equipped with one or more different user 40 interactive devices for collecting a user 40 instruction or presenting and feeding back information to the user 40.

These interactive devices include, but are not limited to: keys, display screens, touch screens, loudspeakers, and remote control action bars. For example, the remote control device 30 may be equipped with a touch control display screen through which remote control instructions from the user 40 to the unmanned aerial vehicle 10 are received.

In some embodiments, the unmanned aerial vehicle 10 and the remote control device 30 may also incorporate the existing image vision processing techniques therebetween to further provide more intelligent services. For example, the unmanned aerial vehicle 10 can collect an image by means of a bifocal camera, and the remote control device 30 parses the image so as to realize the gesture control of the user 40 on the unmanned aerial vehicle 10.

Figure 2:
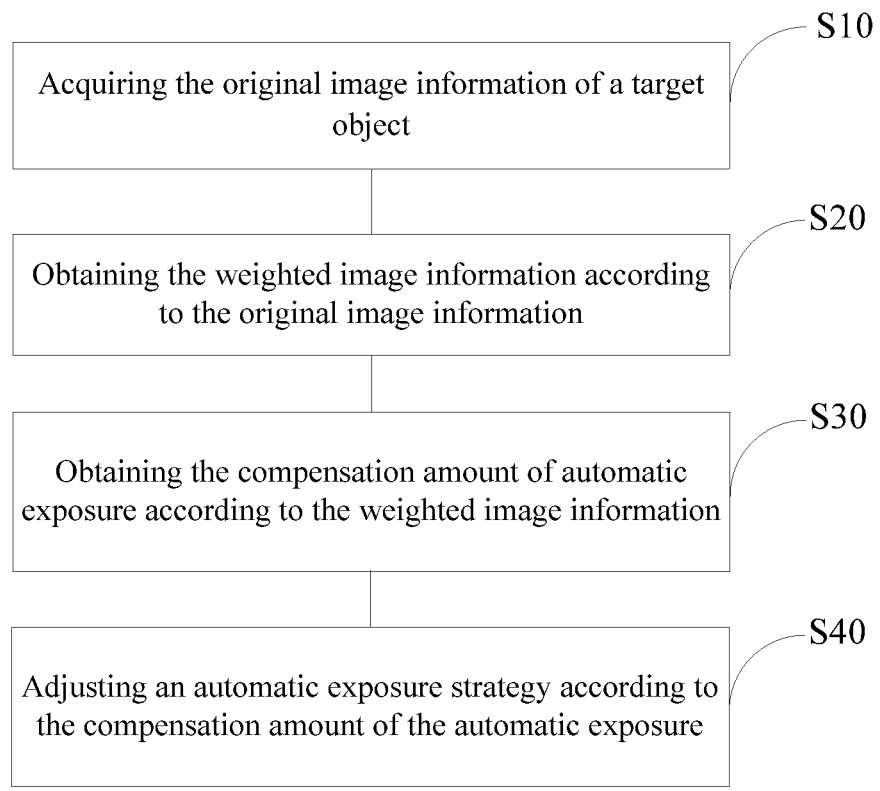
FIG. 2 is a schematic flow diagram of an image exposure method according to an embodiment of the present invention.

FIG. 2 illustrates an embodiment of an image exposure method according to an embodiment of the present invention. The method may be executed by the unmanned aerial vehicle of FIG. 1. Specifically, referring to FIG. 2, the method can include, but is not limited to, the following steps:

S10, acquiring the original image information of a target object.

Specifically, the unmanned aerial vehicle is provided with an aerial camera, and the aerial camera is mounted on the unmanned aerial vehicle via a pan-tilt to acquire the original image information about the target object.

Specifically, the pan-tilt is used for fixing the aerial camera, or for adjusting the attitude of the aerial camera at will (for example, changing the shooting direction of the aerial camera) and keeping the aerial camera stably at a set attitude. The pan-tilt comprises a base, a motor, and a motor controller. The base is fixedly connected or detachably connected to the unmanned aerial vehicle for mounting the aerial camera on the unmanned aerial vehicle; the motor is mounted on the base and connected to the aerial camera, and the motor controller is electrically connected to the motor for controlling the motor. The pan-tilt may be a multi-shaft pan-tilt, and the number of motors is adapted thereto, namely, one motor is provided for each shaft.

On the one hand, multiple motors can drive the rotation of the aerial camera so as to satisfy the adjustment of different shooting directions of the aerial camera, and the rotation of the motor is controlled manually and remotely or the motor is rotated automatically by using a program so as to achieve the function of omnibearing scanning and monitoring; on the other hand, in the process of the aerial photography of the unmanned aerial vehicle, through the rotation of the motor, the disturbance applied to the aerial camera is counteracted in real time, so as to prevent the aerial camera from shaking and ensure the stability of the original image information of the photographed target object.

S20, obtaining the weighted image information according to the original image information.

Specifically, after collecting the original image information, the unmanned aerial vehicle performs image processing, and then performs the processing through a following algorithm, and then can manipulate the flight control to perform following flight. When the unmanned aerial vehicle automatically follows the target object, the unmanned aerial vehicle often encounters the change of light and shadow. Sometimes the followed target object even enters a dark place. The followed object has low illuminance, and the background illuminance is high. In this case, the unmanned aerial vehicle is very easy to lose the target when performing following.

Since the target object is moving, the light and shadow thereon is changing. Sometimes it even enters a dark place where the background illumination is very high, which makes the following algorithm difficult. In this regard, the target object serves as a central area for automatic exposure, and the exposed area dynamically changes following the movement of the target.

Specifically, firstly, the target position information about the target object is obtained according to the original image information, and then high-weight exposure is performed on a target area corresponding to the target position information to obtain weighted image information.

The unmanned aerial vehicle is further provided with a storage device, an exposure weight table is pre-stored in the storage device, and high-weight exposure is performed on the target position information via the pre-stored exposure weight table so as to obtain the weighted image information.

S30, obtaining the compensation amount of automatic exposure according to the weighted image information.

Specifically, firstly, obtaining the total image brightness and total image weight corresponding to the weighted image information according to the weighted image information, then obtaining the evaluation value of automatic exposure according to the total image weight and the total image brightness, and further obtaining the compensation amount of automatic exposure according to the acquired target value of the automatic exposure and the evaluation value of the automatic exposure.

S40, adjusting an automatic exposure strategy according to the compensation amount of the automatic exposure.

Specifically, acquiring a brightness specific gravity corresponding to the target area. When the compensation amount of the automatic exposure is greater than a preset exposure threshold value and when the brightness specific gravity is greater than the preset brightness threshold value, the corresponding exposure time, analog gain, and digital gain are increased. When the compensation amount of the automatic exposure is smaller than a preset exposure threshold value and when the brightness specific gravity is greater than the preset brightness threshold value, the corresponding exposure time, analog gain, and digital gain are reduced.

An embodiment of the present invention provides an image exposure method. The method firstly acquires the original image information about a target object, then obtains the weighted image information according to the original image information, further obtains the compensation amount of automatic exposure according to the weighted image information, and finally adjusts an automatic exposure strategy according to the compensation amount of the automatic exposure. The above-mentioned method prevents an unmanned aerial vehicle from easily losing a target during the process of the unmanned aerial vehicle automatically following a moving object, even when encountering a change in light and shadow.

Figure 3:
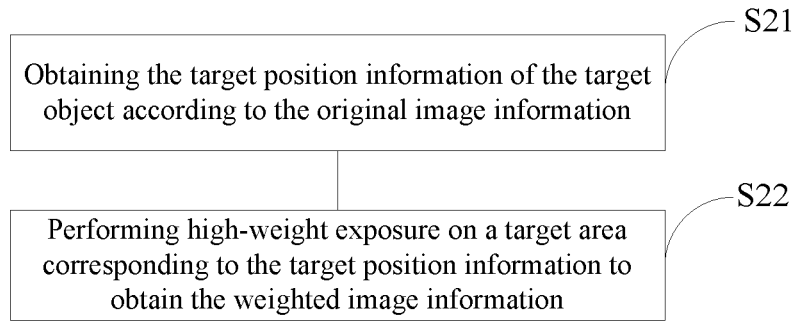
FIG. 3 is a schematic flow diagram of S20 in FIG. 2.

In order to obtain the weighted image information better according to the original image information, in some embodiments, referring to FIG. 3, S20 comprises the following steps:

S21, according to the original image information, obtaining a target position information of the target object.

Figure 4:
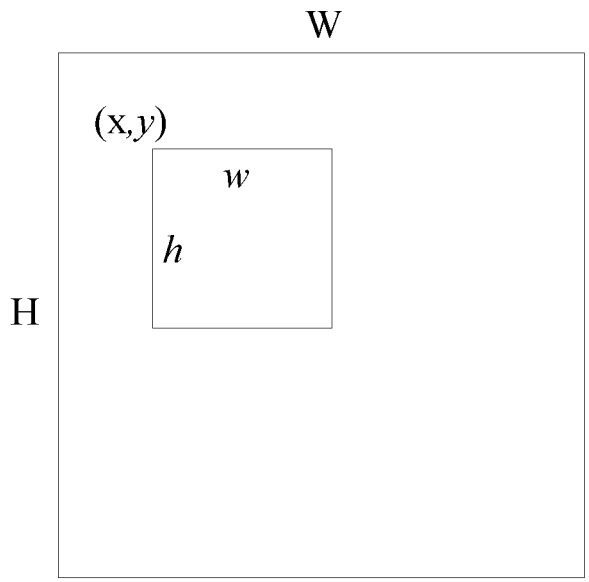
FIG. 4 is a schematic view of target position information corresponding to a target object according to an embodiment of the present invention.

Specifically, as shown in FIG. 4, the following algorithm can calculate the target position information (x, y, w, h) of the target object in real time from the original image information, wherein x represents the starting position of the area in the horizontal coordinate of the whole image, y represents the vertical starting position, w is the target area width, h is the target area height, W is the whole image width, and H is the whole image height.

S22, performing high-weight exposure on a target area corresponding to the target position information to obtain the weighted image information.

Specifically, the area position of a moving object is calculated in real time, and a canny edge detection mode can be adopted, and a target area corresponding to the target position information can also be obtained based on a depth learning mode, and then a high-weight exposure can be performed on the target area to obtain the weighted image information.

Figure 5:
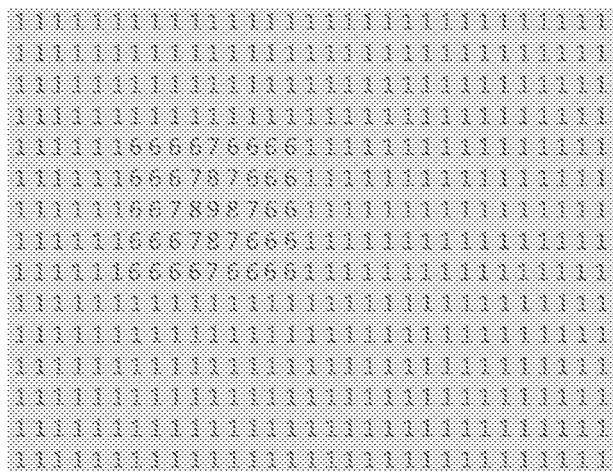
FIG. 5 is a schematic view of a high-weight exposure of a target area according to an embodiment of the present invention.

The unmanned aerial vehicle is further provided with a storage device. An exposure weight table is pre-stored in the storage device, and as shown in FIG. 5, high-weight exposure is performed on the target area via the pre-stored exposure weight table so as to obtain the weighted image information.

The storage device may be a memory of flash memory type, a hard disk type memory, a micro multimedia card memory, a card type memory (e.g. SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Figure 6:
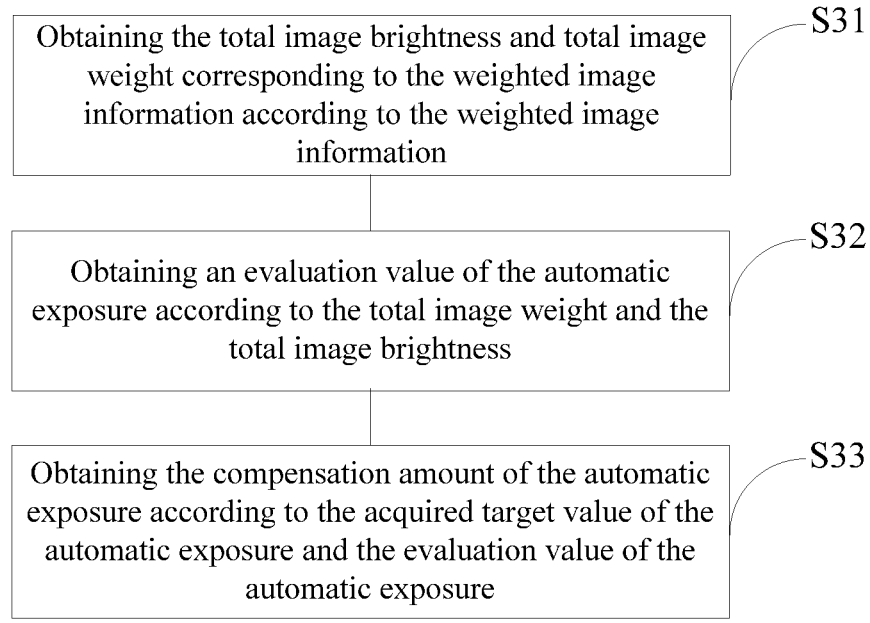
FIG. 6 is a schematic flow diagram of S30 in FIG. 2.

In order to obtain the compensation amount of automatic exposure according to the weighted image information better, in some embodiments, referring to FIG. 6, S30 comprises the following steps:

S31, according to the weighted image information, obtaining the total image brightness and total image weight corresponding to the weighted image information.

Specifically, the total image brightness and total image weight corresponding to the weighted image information can be obtained by the following calculation formula:

$$Y=\Sigma_{i=0,j=0}^{i=W,j=H}(a_{i,j}Y_{i,j}), Q_{sum}=\Sigma_{i=0,j=0}^{i=W,j=H}(a_{i,j})$$

where Y is the total image brightness corresponding to the weighted image information, and $Q_{sum}$ is the total image weight corresponding to the weighted image information.

S32, obtaining an evaluation value of the automatic exposure according to the total image weight and the total image brightness.

Specifically, after acquiring the total image weight and the total image brightness corresponding to the weighted image information, the evaluation value of the automatic exposure can be obtained by the following calculation formula:

$$P = \frac{Y}{Qsum} = \frac{\sum_{i=0,j=0}^{i=W,j=H}(a_{i,j}Y_{i,j})}{\sum_{i=0,j=0}^{i=W,j=H}(a_{i,j})}$$

where P is an evaluation value of the automatic exposure.

S33, obtaining the compensation amount of the automatic exposure according to the acquired target value of the automatic exposure and the evaluation value of the automatic exposure.

Specifically, it is assumed that the target value of the automatic exposure is $Y_0$, and the compensation amount of the automatic exposure is:

$$C = \frac{Y_0 \sum_{i=0,j=0}^{i=W,j=H}(a_{i,j})}{\sum_{i=0,j=0}^{i=W,j=H}(a_{i,j}Y_{i,j})}$$

Figure 7:
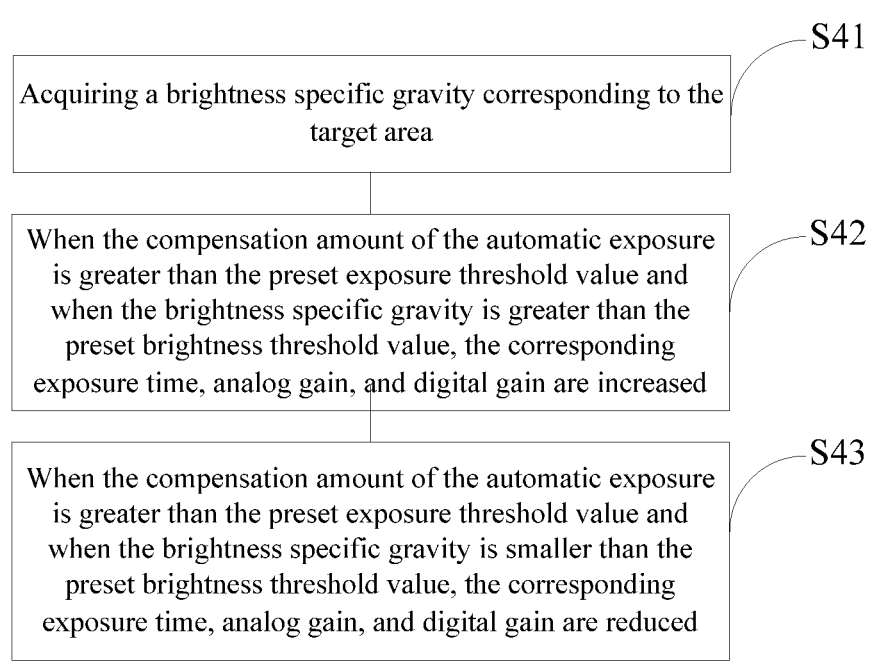
FIG. 7 is a schematic flow diagram of S40 in FIG. 2.

In order to better adjust the automatic exposure strategy according to the compensation amount of the automatic exposure, in some embodiments, referring to FIG. 7, S40 comprises the following steps:

S41, acquiring a brightness specific gravity corresponding to the target area.

Specifically, firstly, a target area weighted brightness corresponding to the target area is acquired, and then a brightness specific gravity is obtained according to the total image brightness and the target area weighted brightness.

Specifically, the target area weighted brightness is $Y_s=\Sigma_{i=x,j=y}^{i=x+w,j=y+h}(a_{i,j}Y_{i,j})$, thereby obtaining that the specific gravity b occupied by target area weighted brightness in the weighted image information is:

$$b = \frac{Y_s}{Y} = \frac{\sum_{i=x,j=y}^{i=x+w,j=y+h}(a_{i,j}Y_{i,j})}{\sum_{i=0,j=0}^{i=W,j=H}(a_{i,j}Y_{i,j})}$$

S42, when the compensation amount of the automatic exposure is greater than the preset exposure threshold value and when the brightness specific gravity is greater than the preset brightness threshold value, the corresponding exposure time, analog gain, and digital gain are increased.

Specifically, if the preset exposure threshold value is 1, the closer the compensation amount of the automatic exposure is to 1, the automatic exposure tends to be stable.

When the compensation amount of the automatic exposure is much greater than one, it indicates that the image is dark. At this time, the automatic exposure strategy will increase the exposure time, the analog gain, and the digital gain to brighten the total image brightness.

If the exposure weight of the target area is large, the specific gravity b of the weighted luminance of the target area in the weighted image information is very large; if the image of the target area is very dark, even if the surrounding area is slightly bright, the total luminance of the image is relatively small, so that the evaluation value of the automatic exposure is smaller than the target value of the automatic exposure, and the compensation amount of the automatic exposure is greater than 1, and at such time, the automatic exposure strategy will brighten the total image brightness.

S43, when the compensation amount of the automatic exposure is greater than the preset exposure threshold value and when the brightness specific gravity is smaller than the preset brightness threshold value, the corresponding exposure time, analog gain, and digital gain are reduced.

Specifically, if the preset exposure threshold is 1, when the compensation amount of automatic exposure is much smaller than 1, the automatic exposure strategy will reduce the exposure time, the analog gain, and the digital gain to lower the total image brightness.

If the target area image is too bright, even if the surrounding area is slightly dark, since the specific gravity b of the weighted brightness of the target area in the weighted image information is relatively large, the total image brightness is relatively large, and thus the evaluation value of the automatic exposure is greater than the target value of the automatic exposure. Therefore, the compensation amount of the automatic exposure is smaller than 1, then the automatic exposure strategy will lower the overall brightness of the whole image.

As stated above, an area with a high weight automatically follows the movement of the target object to move, and the brightness of the whole image also changes according to the brightness of the target area; even if the target object enters a dark area and the whole picture periphery is bright, the brightness of the whole image can well adapt to the changing scenario. Namely, high-weight exposure is performed on the target area, and the area follows the moving object to move, so as to well maintain the brightness of the object when the moving object enters a dark area or an over-bright area, thus ensuring the stability of the following algorithm.

It should be noted that in the above-mentioned embodiments, there is not necessarily a certain order between the above-mentioned steps, and a person of ordinary skills in the art can understand from the description of the embodiments of the present application that in different embodiments, the above steps may have different execution orders, that is, they may be executed in parallel or interchangeably, etc.

Figure 8:
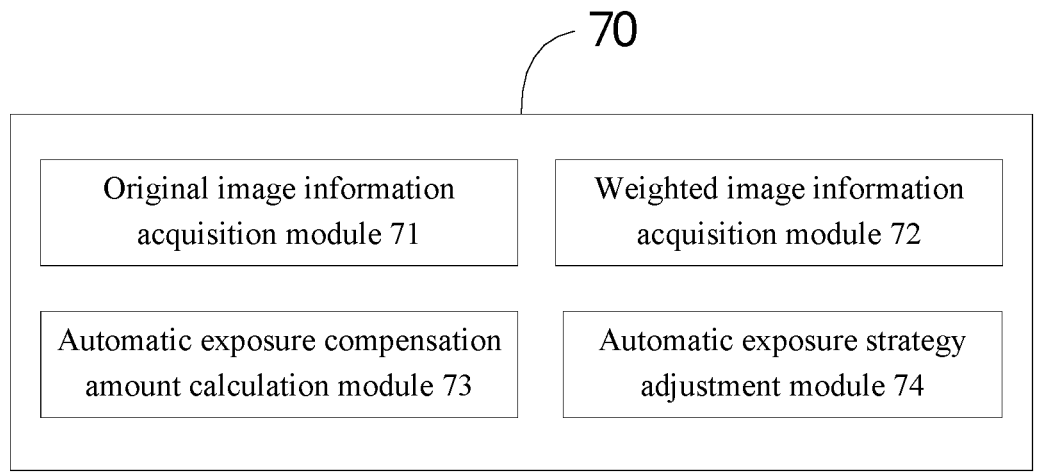
FIG. 8 is a block diagram showing a structure of an image exposure device according to an embodiment of the present invention.

As another aspect of embodiments of the present application, the embodiment of the present application provides an image exposure method device 70 which is applied to an unmanned aerial vehicle. Referring to FIG. 8, the image exposure method device 70 includes an original image information acquisition module 71, a weighted image information acquisition module 72, an automatic exposure compensation amount calculation module 73, and an automatic exposure strategy adjustment module 74.

The original image information acquisition module 71 is used for acquiring the original image information about a target object.

The weighted image information acquisition module 72 is used for obtaining the weighted image information according to the original image information.

The automatic exposure compensation amount calculation module 73 is used for obtaining the compensation amount of an automatic exposure according to the weighted image information.

The automatic exposure strategy adjustment module 74 is used for adjusting an automatic exposure strategy according to the compensation amount of the automatic exposure.

Therefore, the present embodiment firstly acquires the original image information about a target object, then obtains the weighted image information according to the original image information, further obtains the compensation amount of automatic exposure according to the weighted image information, and finally adjusts an automatic exposure strategy according to the compensation amount of the automatic exposure. The above-mentioned method prevents an unmanned aerial vehicle from easily losing a target during the process of the unmanned aerial vehicle automatically following a moving object, even when encountering a change in light and shadow.

In some embodiments, the weighted image information acquisition module 72 comprises a target position information acquisition unit and a high-weight exposure unit;

the target position information acquisition unit is used for obtaining target position information about the target object according to the original image information;

the high-weight exposure unit is used for performing high-weight exposure on a target area corresponding to the target position information to obtain the weighted image information.

In some embodiments, the automatic exposure compensation amount calculation module 73 comprises an image information acquisition unit, an automatic exposure evaluation value acquisition unit, and an automatic exposure compensation amount calculation unit;

the graphic information acquisition unit is used for obtaining the total image brightness and the total image weight corresponding to the weighted image information according to the weighted image information.

The automatic exposure evaluation value acquisition unit is used for obtaining an evaluation value of automatic exposure according to the total image weight and the total image brightness.

The automatic exposure compensation amount calculation unit is used for obtaining the compensation amount of automatic exposure according to the acquired target value of the automatic exposure and the evaluation value of the automatic exposure.

In some embodiments, the automatic exposure strategy adjustment module comprises a brightness specific gravity acquisition unit, a first exposure strategy adjustment unit, and a second exposure strategy adjustment unit;

the brightness specific gravity acquisition unit is used for acquiring a brightness specific gravity corresponding to the target area, and the brightness specific gravity acquisition unit is specifically used for acquiring a target area weighted brightness corresponding to the target area, and obtaining the brightness specific gravity according to the total image brightness and the target area weighted brightness.

The first exposure strategy adjustment unit is used for increasing the corresponding exposure time, analog gain, and digital gain when the compensation amount of the automatic exposure is greater than a preset exposure threshold value and when the brightness specific gravity is greater than the preset brightness threshold value.

The second exposure strategy adjustment unit is used for reducing the corresponding exposure time, analog gain, and digital gain when the compensation amount of the automatic exposure is smaller than a preset exposure threshold value and when the brightness specific gravity is greater than the preset brightness threshold value.

Figure 9:
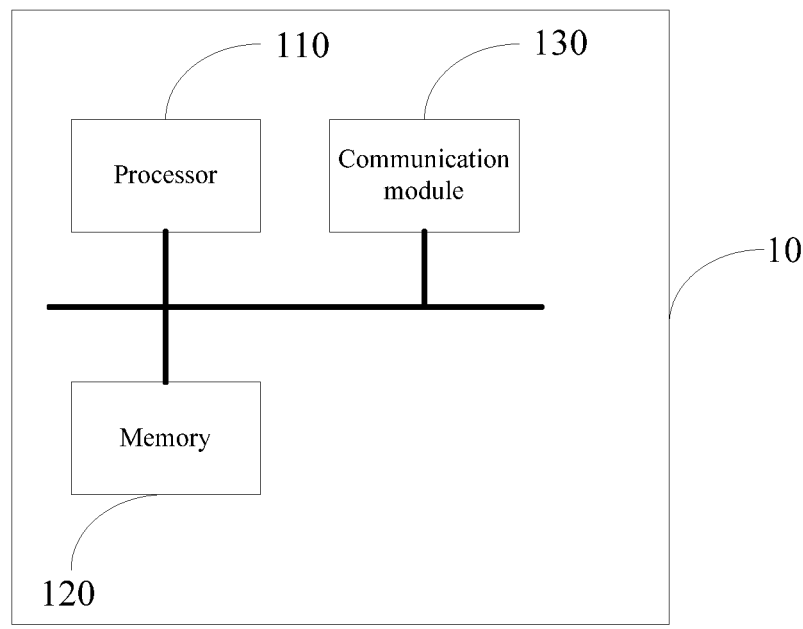
FIG. 9 is a block diagram showing a structure of an unmanned aerial vehicle according to an embodiment of the present invention.

FIG. 9 is a schematic view showing the structure of an unmanned aerial vehicle 10 according to an embodiment of the present application. The unmanned aerial vehicle 10 may be any type of unmanned vehicle capable of executing the image exposure method according to the above-mentioned corresponding method embodiment or running the image exposure method device 70 according to the above-mentioned corresponding device embodiment. The unmanned aerial vehicle comprises a fuselage, a horn, a power device, an infrared emission device, a flight control module 110, a memory 120, and a communication module 130.

The horn is connected to the fuselage; the power device is provided on the horn for providing the unmanned aerial vehicle with flight power; the infrared emission device is arranged in the fuselage and is used for sending infrared access information and receiving an infrared control instruction sent by a remote control device;

the flight control module has the capability to monitor, operate and manipulate unmanned aerial vehicle flights and missions, including a set of apparatuses for controlling the launching and recovery of the unmanned aerial vehicle. The flight control module may also modulate a binary digital signal into an infrared signal in the form of a corresponding optical pulse or demodulate an infrared signal in the form of optical pulses into a binary digital signal.

The flight control module 110, the memory 120, and the communication module 130 establish a communication connection between any of the two by means of a bus.

The flight control module 110 may be any type of flight control module 110 having one or more processing cores. It may execute single-threaded or multi-threaded operations for parsing instructions to execute operations such as acquiring data, executing logical operation functions, and delivering operation and processing results.

As a non-transitory computer-readable storage medium, the memory 120 can be used for storing a non-transitory software program, a non-transitory computer-executable program, and modules, such as program instructions/modules corresponding to an image exposure method in an embodiment of the present invention (for example, an original image information acquisition module 71, a weighted image information acquisition module 72, an automatic exposure compensation amount calculation module 73, and an automatic exposure strategy adjustment module 74 shown in FIG. 8). The flight control module 110 executes various functional applications and data processing of the image exposure method device 70 by running the non-transient software programs, instructions, and modules stored in the memory 120, i.e., it implements the image exposure method in any of the method embodiments described above.

The memory 120 can comprise a program storage area and a data storage area. The program storage area can store an operating system and an application program required by at least one function; the stored data area may store data created from the use of the image exposure method device 70, etc. In addition, memory 120 may include high-speed random access memory and may also include non-transitory memory, such as at least one magnetic disk storage device, flash memory device, or other non-transitory solid-state storage devices. In some embodiments, the memory 120 may optionally include memory remotely provided with respect to the flight control module 110. These remote control memories may be connected to the unmanned aerial vehicle 10 via a network. Examples of such networks include, but are not limited to, the Internet, intranet, local area network, mobile communication network, and combinations thereof.

The memory 120 stores instructions executable by at least one flight control module 110; at least one flight control module 110 is configured to execute the instruction to implement the image exposing method in any of the method embodiments described above, e.g., to execute step 10, step 20, step 30, step 40, etc. of the methods described above to implement the functions of modules 71-74 in FIG. 8.

The communication module 130 is a functional module for establishing a communication connection and providing a physical channel. The communication module 130 may be any type of wireless or wired communication module 130 including, but not limited to, a WiFi module or a Bluetooth module, etc.

Further, an embodiment of the present invention also provides a non-transitory computer-readable storage medium storing computer-executable instructions for execution by one or more flight control modules 110, e.g. by one flight control module 110 of FIG. 9, that cause the one or more flight control modules 110 to perform the image exposure method of any of the method embodiments described above, e.g. to execute step 10, step 20, step 30, step 40, etc. of the method described above to implement the functions of modules 71-74 in FIG. 8.

The device embodiments described above are merely illustrative. The units described as separate components may or may not be physically separated, and components displayed as units may or may not be physical units, that is, may be located in one place, or distributed to multiple network units. Some or all of the modules may be selected according to actual needs to achieve the object of the implementation schemes.

From the description of the above implementation schemes, those of ordinary skills in the art can clearly understand that each implementation scheme can be implemented by means of software plus a general hardware platform, and certainly can also be implemented by hardware. It will be appreciated by those of ordinary skills in the art that implementing all or part of the flow of the above-described embodiment method may be accomplished by a computer program in a computer program product instructing relevant hardware. The computer program may be stored in a non-transitory computer-readable storage medium, the computer program including program instructions which, when executed by relevant equipment, cause the relevant equipment to execute the flow of the embodiments of the methods. The storage medium may be a magnetic disk, an optical disk, a Read-Only Memory (ROM), or a Random Access Memory (RAM), etc.

The above-mentioned product can execute an image exposure method provided by an embodiment of the present invention, and has corresponding functional modules and advantageous effects for executing the image exposure method. Technical details not described in detail in this embodiment can be referred to the image exposure method provided in the embodiments of the present invention.

The present invention is described with reference to flowcharts and/or block diagrams of methods, apparatus (systems), and computer program products according to embodiments of the invention. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general-purpose computer, special purpose computer, embedded processor, or other programmable data processing apparatuses to produce a machine such that the instructions, which executed via the processor of the computer or other programmable data processing apparatuses, create a device for implementing the functions specified in one or more flows in flowcharts and/or one or more blocks in block diagrams.

These computer program instructions may also be loaded onto a computer or other programmable data processing apparatuses to cause a series of operational steps to be executed on the computer or other programmable apparatuses to produce a computer-implemented process such that the instructions executed on the computer or other programmable apparatuses provide steps for implementing the functions specified in one or more flows in flowcharts and/or one or more blocks in block diagrams.

The above descriptions are only preferred embodiments of the present invention and are not intended to limit the present invention. Any modifications, equivalent replacements and improvements made within the spirit and principles of the present invention shall be included in the scope of the present invention.

Finally, it should be noted that: the above embodiments are merely illustrative of the technical solutions of the present invention, rather than limiting it; combinations of technical features in the above embodiments or in different embodiments are also possible within the spirit of the invention, the steps can be implemented in any order, and there are many other variations of the different aspects of the invention described above, which are not provided in detail for the sake of brevity; although the present invention has been described in detail with reference to the foregoing embodiments, those skilled in the art will appreciate that: the technical solutions disclosed in the above-mentioned embodiments can still be modified, or some of the technical features thereof can be replaced by equivalents; such modifications or substitutions do not make the essence of the corresponding technical solutions deviate from the scope of the technical solutions of the embodiments of the present invention.

The invention claimed is:

1. An image exposure method applied to an unmanned aerial vehicle comprising:
   acquiring original image information of a target object:
   obtaining weighted image information according to the original image information;
   obtaining compensation amount of automatic exposure according to the weighted image information;
   and adjusting an automatic exposure strategy according to the compensation amount of the automatic exposure;
   wherein the obtaining weighted image information according to the original image information comprises:
   according to the original image information, obtaining target position information of the target object;
   and performing high-weight exposure on a target area corresponding to the target position information to obtain the weighted image information;
   wherein the obtaining compensation amount of automatic exposure according to the weighted image information comprises:
   according to the weighted image information, obtaining a total image brightness and a total image weight corresponding to the weighted image information;
   obtaining an evaluation value of the automatic exposure according to the total image weight and the total image brightness;
   and obtaining the compensation amount of the automatic exposure according to acquired target value of the automatic exposure and the evaluation value of the automatic exposure.

2. The method according to claim 1, wherein the adjusting an automatic exposure strategy according to the compensation amount of the automatic exposure comprises:
   acquiring a brightness specific gravity corresponding to the target area;
   and when the compensation amount of the automatic exposure is greater than a preset exposure threshold value and when the brightness specific gravity is greater than a preset brightness threshold value, increasing corresponding exposure time, analog gain, and digital gain.

3. The method according to claim 1, wherein the adjusting an automatic exposure strategy according to the compensation amount of the automatic exposure comprises:
   acquiring a brightness specific gravity corresponding to the target area;
   and when the compensation amount of the automatic exposure is smaller than a preset exposure threshold value and when the brightness specific gravity is greater than a preset brightness threshold value, reducing corresponding exposure time, analog gain, and digital gain.

4. The method according to claim 2, wherein the acquiring a brightness specific gravity corresponding to the target area comprises:
   acquiring a target area weighted brightness corresponding to the target area;
   and obtaining a brightness specific gravity according to the total image brightness and the target area weighted brightness.

5. An image exposure device applied to an unmanned aerial vehicle, comprising:
   a memory, communicatively connected to the at least one processor, wherein
   the memory stores instructions executable by the at least one processor, the instructions, when executed by the at least one processor, causing the at least one processor to:
   acquire original information of a target object;
   obtain weighted image information according to the original image information;
   obtain compensation amount of automatic exposure according to the weighted image information;
   and adjust an automatic exposure strategy according to the compensation amount of the automatic exposure;
   obtain target position information about the target object according to the original image information;
   and perform high-weight exposure on a target area corresponding to the target position information to obtain the weighted image information;
   obtain a total image brightness and a total image weight corresponding to the weighted image information according to the weighted image information;
   obtain an evaluation value of the automatic exposure according to the total image weight and the total image brightness;
   and obtain the compensation amount of the automatic exposure according to acquired target value of the automatic exposure and the evaluation value of the automatic exposure.

6. The device according to claim 5, wherein the at least one processor are further configured to:
   acquire a brightness specific gravity corresponding to the target area;
   and when the compensation amount of the automatic exposure is greater than a preset exposure threshold value and when the brightness specific gravity is greater than a preset brightness threshold value, increase corresponding exposure time, analog gain, and digital gain.

7. The device according to claim 5, wherein the at least one processor are further configured to:
   acquire a brightness specific gravity corresponding to the target area;
   and when the compensation amount of the automatic exposure is smaller than a preset exposure threshold value and when the brightness specific gravity is greater than a preset brightness threshold value, reduce corresponding exposure time, analog gain, and digital gain.

8. The device according to claim 6, wherein the at least one processor are further configured to:
   acquire a target area weighted brightness corresponding to the target area;
   and obtain a brightness specific gravity according to the total image brightness and the target area weighted brightness.

9. An unmanned aerial vehicle comprising:
   a fuselage;
   a horn connected to the fuselage;
   a power device provided on the horn for providing flying power to the unmanned aerial vehicle;
   as flight control module; and
   a memory communicatively connected to the flight control module; wherein the memory stores instructions executable by the flight control module, the instructions being executed by the flight control module to enable the flight control module to: acquire original image information of a target object;
   obtain weighted image information according to the original image information;

obtain compensation amount of automatic exposure according to the weighted image information;

and adjust an automatic exposure strategy according to the compensation amount of the automatic exposure;

obtain target position information about the target object according to the original image information:

and perform high-weight exposure on a target area corresponding to the target position information to obtain the weighted image information;

wherein the flight control module are further configured to:

obtain a total image brightness and a total image weight corresponding to the weighted image information according to the weighted image information;

obtain an evaluation value of the automatic exposure according to the total image weight and the total image brightness;

and obtain the compensation amount of the automatic exposure according to acquired target value of the automatic exposure and the evaluation value of the automatic exposure.

10. The unmanned aerial vehicle according to claim 9, wherein the flight control module are further configured to:

acquire a brightness specific gravity corresponding to the target area;

and when the compensation amount of the automatic exposure is greater than a preset exposure threshold value and when the brightness specific gravity is greater than a preset brightness threshold value, increase corresponding exposure time, analog gain, and digital gain.

11. The unmanned aerial vehicle according to claim 9, wherein the flight control module are further configured to:

acquire a brightness specific gravity corresponding to the target area;

and when the compensation amount of the automatic exposure is smaller than a preset exposure threshold value and when the brightness specific gravity is greater than a preset brightness threshold value, reduce corresponding exposure time, analog gain, and digital gain.

12. The unmanned aerial vehicle according to claim 10, wherein the flight control module are further configured to:

acquire a target area weighted brightness corresponding to the target area;

and obtain a brightness specific gravity according to the total image brightness and the target area weighted brightness.

\* \* \* \* \*